United States Patent

Hosoi et al.

[11] Patent Number: 5,978,537
[45] Date of Patent: Nov. 2, 1999

[54] OPTICAL DROP CABLE-UNITS AGGREGATE CABLE

[75] Inventors: Fumiki Hosoi; Kazuo Hogari, both of Tokyo; Shin-ichi Furukawa, Mito, all of Japan

[73] Assignees: The Furukawa Electric Co., Ltd.; Nippon Telegraph & Telephone Corporation, both of Tokyo, Japan

[21] Appl. No.: 08/935,596

[22] Filed: Sep. 23, 1997

[30] Foreign Application Priority Data

Sep. 26, 1996 [JP] Japan .................................. 8-254298

[51] Int. Cl.⁶ ...................................................... G02B 6/44
[52] U.S. Cl. ............................................ 385/112; 385/113
[58] Field of Search ..................................... 385/100–114

[56] References Cited

U.S. PATENT DOCUMENTS

| | | | |
|---|---|---|---|
| 4,896,940 | 1/1990 | Kathiresan et al. ................. | 350/96.34 |
| 5,165,003 | 11/1992 | Carter ....................................... | 385/112 |
| 5,289,556 | 2/1994 | Rawlyk et al. .......................... | 385/112 |
| 5,369,720 | 11/1994 | Parry et al. .............................. | 385/114 |

*Primary Examiner*—Hung N. Ngo
*Attorney, Agent, or Firm*—Frishauf, Holtz, Goodman, Langer & Chick, P.C.

[57] ABSTRACT

An optical drop cable-units cable comprising a plastic pipe and a plurality of strandless optical drop cable-units and held in the plastics pipe, in which a space factor $$(B \times n/A) \times 100(\%) \leq 51\%$$

where

A: void cross-sectional area of the plastic pipe,

B: a cross-sectional area of a single optical drop cable-unit, and n: number of optical drop cable-units.

4 Claims, 1 Drawing Sheet

OPTICAL DROP CABLE-UNITS AGGREGATE CABLE

BACKGROUND OF THE INVENTION

The present invention relates to a cable assembly containing, a plurality of optical cable-units in a pipe. As used herein, a cable-unit is an element which can, in numbers, form a single cable, or which can alone serve as a subscriber's drop optical cable.

In an optical access system connecting a telephone office and subscriber terminals via an optical fiber, the adoption of an optical drop cable-unit as shown, for example, in FIG. 1 has been studied for use in making a direct connection to the subscriber terminals.

In FIG. 1, the optical drop cable-unit 1 is comprised of a unit formed by covering a core fiber, a pair of strength members 3 arranged astride of the core fiber and suspension member 4 with common covering 5 made of plastic.

As an optical drop cable-unit connection method, the following method is employed. An assembled cable 8 is suspended in such a form as shown in FIG. 2. The assembled cable 8 comprises a polyethylene pipe 7 formed integral with a sustainer members 6 and having a plurality of strandless optical drop cable-units 1 held therein. The pipe 7 is opened in such a position and a given one is led out of the optical drop cable-units 1 and dropped (connected) to the subscriber terminal.

In such an optical drop cable-unit cable 8, it is required that any given optical drop cable-unit be led out of the optical drop cable-units 1 held in the pipe 7. If, however, many more optical drop cable-units 1 are held in the pipe 7, too great a force is required for leading of the optical drop cable-unit, thus causing the leading operation to fail.

BRIEF SUMMARY OF THE INVENTION

It is accordingly the object of the present invention to provide an optical drop cable-unit assembled cable in which any given optical drop cable-unit can be easily led from a plurality of optical drop cable-units in a pipe.

According to the present invention, there is provided an optical drop cable-units cable which comprises a plastic pipe and a plurality of strandless optical drop cable-units assembled and contained in the plastics pipe, wherein a space factor $[(B \times n/A) \times 100(\%)]$ remains at 51% or less, given A: void cross-sectional area of the plastic pipe;

B: cross-sectional area of a single optical drop cable-unit; and n: number of optical drop cable-units.

Additional object and advantages of the invention are set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An optical drop cable-unit assembled cable is characterized in that $(B \times n/A) \times 100(\%) \leq 51(\%)$ where A represents a void cross-section, B, a cross-sectional area of one optical drop cable-unit and n the number of optical drop cable-units.

When $(B \times n/A) \times 100(\%) > 51(\%)$, then too great a force is required for leading of any given one out of a plurality of drop cable-units, thus causing a damage to the drop cable-units. The value of $(B \times n/A) \times 100(\%)$ is preferably between 35.3 and 44.7%. This range corresponds to 3 to 6 kg of the leading force. The upper limit of the range is the force with which an operator can easily lead an optical drop cable-unit, and the lower limit of the range is the force which can cause no damage to the terminal portion due to moving of the drop cable-unit in the pipe.

The pipe used for the drop cable-units cable of the present invention, is made of plastic, but is not restricted to any specific plastic. For example, the pipe may preferably be made of polyethylene.

Figure 1:
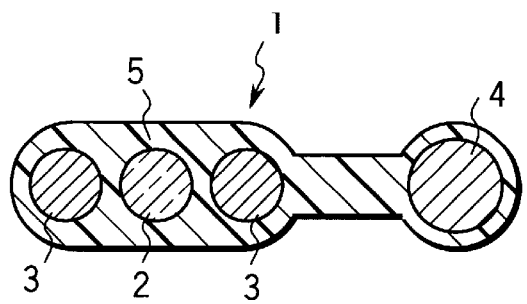
FIG. 1 is a cross-sectional view showing one example of an optical drop cable-unit.

The drop cable-unit for use in the drop cable-unit assembled cable of the present invention has a structure as shown in FIG. 1. That is, the drop cable-unit 1 is comprised of a unit formed by covering a core fiber 2, a pair of strength members 3 one at each side of the core fiber 2 and suspension member 4 with a common plastic covering 5. As the strength member 3 use is made usually of steel. As the plastic of which the common covering 5 is formed, use is made of PVC (polyvinyl chloride).

Figure 2:
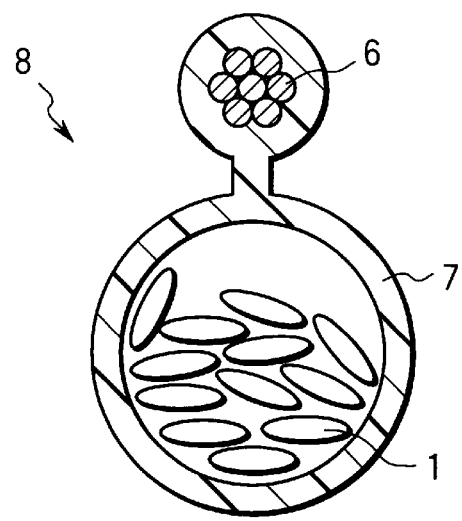
FIG. 2 is a cross-sectional view showing an optical drop cable-units assembled cable.

The optical drop cable-units cable of the present invention is comprised of, as shown in FIG. 2 for instance, a polyethylene pipe 7 formed integral with sustainer members 6 and assembling and holding a plurality of strandless optical drop cable-units 1 therein.

The inventors manufactured, as shown in FIG. 2, an optical drop cable-units cable holding a plurality of optical drop cable-units 1 having a void cross-sectional area 10.64 mm$^2$ as shown in FIG. 1 in a polyethylene pipe 7 having a void cross-sectional area of 454.2 mm$^2$ and measured the forces with which a given one was led out of the optical drop cable-units in the polyethylene pipe 7.

The force was measured by varying the number of the drop cable-units, and hence their space factor $(B \times n/A) \times 100$ (%). The measurements are shown in Table below, with a note that the assembled cable is 60 m in length.

TABLE

| Space factor (%) | Leading force (kg) | The state of led units |
|---|---|---|
| 59.0 | 25 | damaged |
| 56.5 | 20 | damaged |
| 54.0 | 15 | damaged |
| 51.0 | 13 | not damaged |
| 49.4 | 9.0 | not damaged |
| 47.1 | 6.5 | not damaged |
| 44.7 | 6.0 | not damaged |

TABLE-continued

| Space factor (%) | Leading force (kg) | The state of led units |
|---|---|---|
| 42.4 | 4.8 | not damaged |
| 40.0 | 3.7 | not damaged |
| 37.6 | 3.9 | not damaged |
| 35.3 | 3.0 | not damaged |
| 32.9 | 2.5 | not damaged |
| 30.6 | 2.6 | not damaged |
| 28.2 | 2.2 | not damaged |
| 25.9 | 2.5 | not damaged |
| 23.5 | 3.0 | not damaged |
| 21.2 | 2.5 | not damaged |
| 18.8 | 2.0 | not damaged |
| 16.5 | 2.0 | not damaged |

Figure 3:
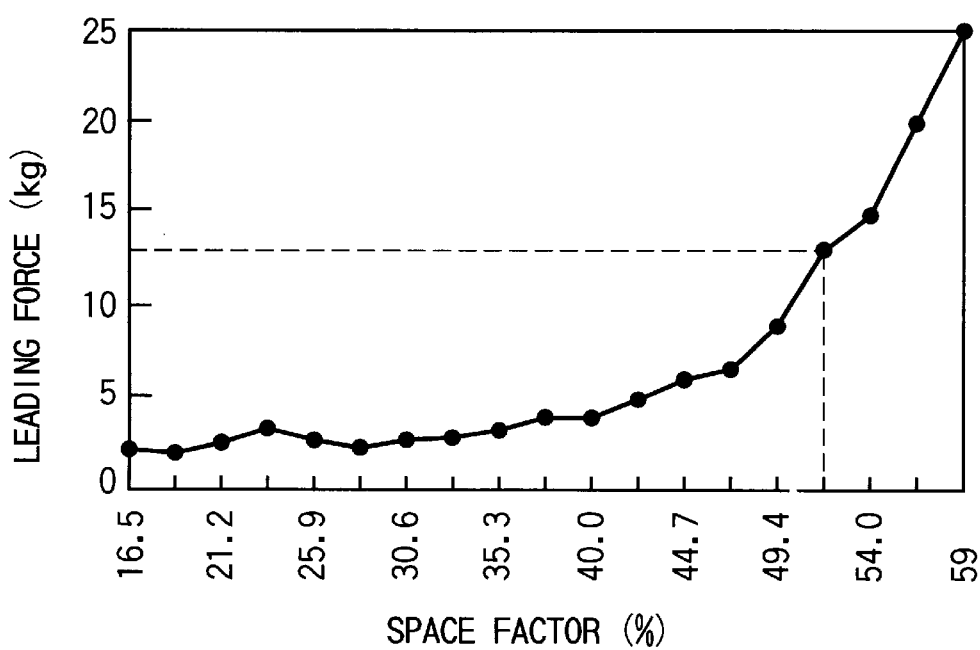
FIG. 3 is a graph showing a relation between the space factor of the optical drop cable-units and a leading force.

The data of the space factor and leading force, being indicated in Table, is as shown in FIG. 3.

The following are evident from the Table above and FIG. 3. That is, the leading of a given one out of the drop cable-units with a force exceeding 13 kg causes outer covering damage to occur due to friction with neighboring units and between the units and the inner surface of the pipe, so that the drop cable-unit is rendered unusable. It is also difficult to lead the given cable-unit itself with a force exceeding 13 kg in the case where the assembled cable is suspended. Even if this is done, moreover, there is a risk that, because such an operation is often performed at high places, the operator will fall down on the ground due to a reactive force on leading the cable-unit.

From the Table and FIG. 3 it is evident that the space factor of those drop cable-units 1 in the pipe has only to be set to be below 51% in order to made the leading force at below 13 kg. That is, by setting the space factor of the optical drop cable-units 1 in the pipe 7 to be below 51%, it is possible to relatively easily lead the drop cable-unit 1 and, in addition, to secure the safety with which an operation is done at high places.

Further, by setting the space factor to be below 44.7% it is possible to make the leading force at below 6 kg and to readily lead the optical cable-unit 1.

As set out above, according to the present invention, an optical drop cable-unit assembled cable is obtained which can easily lead any give one out of those optical drop cable-units without causing any damage to them.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An optical drop cable-units cable comprising a plastic pipe and a plurality of strandless optical drop cable-units assembled and contained in said plastic pipe, wherein a space factor $[(B \times n/A) \times 100(\%)]$ remains at 51% or less, given:

A: void cross-sectional area of said plastic pipe;

B: cross-sectional area of a single optical drop cable-unit; and n: number of optical drop cable-units.

2. The optical drop cable-units cable according to claim 1, wherein said space factor is no less than 35.5% and no more than 44.7%.

3. The optical drop cable-units cable according to claim 1, wherein said plastic pipe is made of polyethylene.

4. The optical drop cable-units cable according to claim 1, wherein said optical drop cable-unit comprises a core fiber, a pair of strength members set astride said core fiber, a suspension member, and a common plastic layer covering said core fiber.

* * * * *